United States Patent Office 3,808,321
Patented Apr. 30, 1974

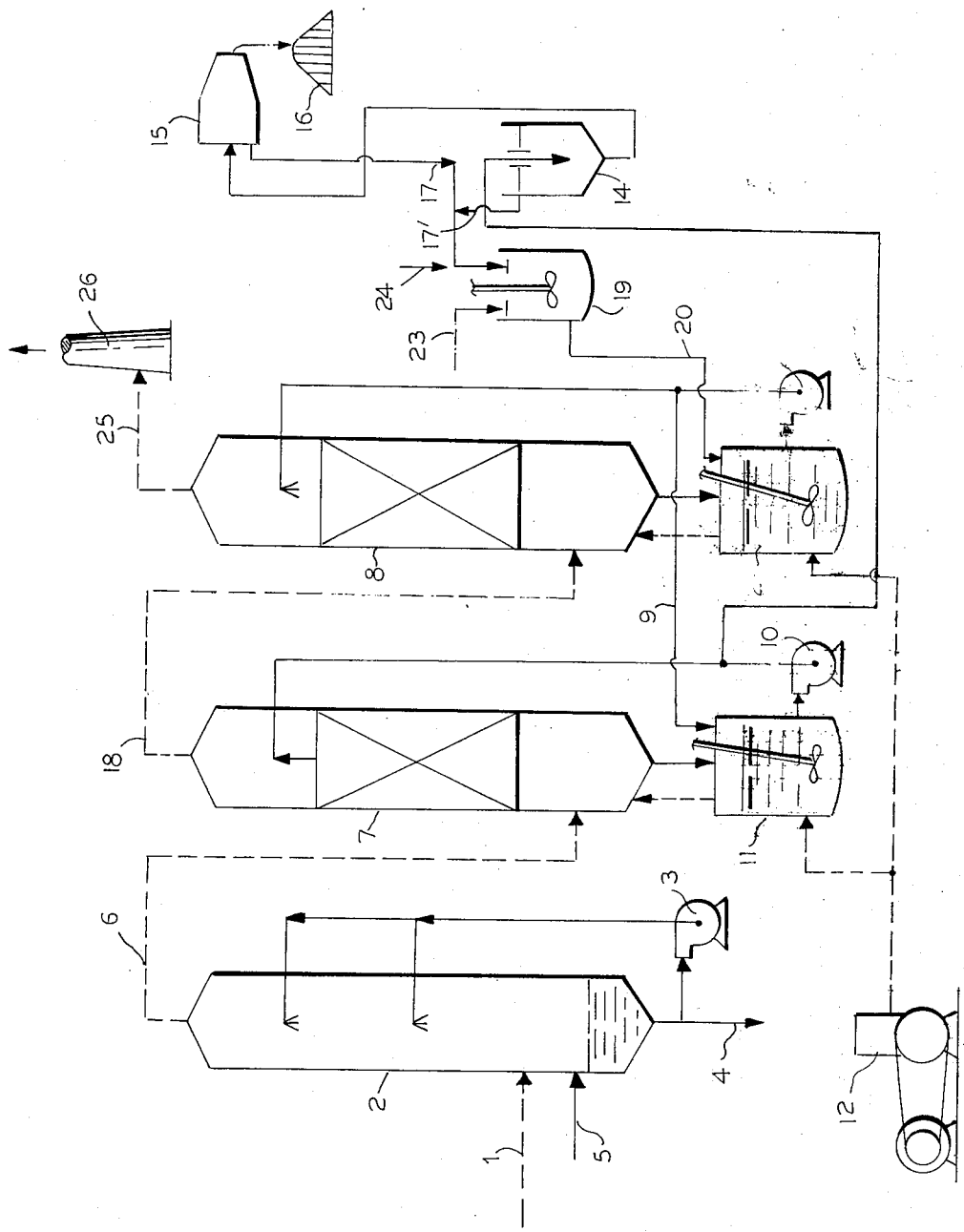

3,808,321
PROCESS FOR DESULFURIZING WASTE FLUE GASES WHILE PRODUCING GYPSUM AS BY-PRODUCT
Saburo Fukui, Masumi Atsukawa, Haruo Kuwabara, and Tetsuaki Urabe, Hiroshima, Japan, assignors to Mitsubishi Jukogyo Kabushiki Kaisha, Tokyo, Japan
Filed Nov. 16, 1971, Ser. No. 199,214
Claims priority, application Japan, Dec. 29, 1970, 46/128,029
Int. Cl. C01b 17/00; C01f 1/00
U.S. Cl. 423—166    2 Claims

ABSTRACT OF THE DISCLOSURE

A process for desulfurizing waste flue gases while producing gypsum as by-product, characterized in that fine air bubble generating means is provided in an absorbing liquid reservoir from which an absorbing liquid is supplied to a gas absorbing unit, and the absorbing liquid is oxidized in said reservoir with air introduced therein and divided into fine air bubbles by said means.

---

This invention relates to a process for desulfurizing waste flue gases while producing gypsum as a by-product, by removing sulfur oxides present in the waste flue gases with a suspension containing at least one of calcium hydroxide and calcium carbonate as absorbent, characterized in that the suspension containing the absorbent is oxidized in a liquid circulation line of an absorbing unit, whereby the utility of the absorbent is enhanced and the attachment of a gypsum scale to the inner wall of the absorbing unit is prevented and further gypsum is collected directly from the absorbing liquid.

A waste flue gas desulfurizing process comprising reacting an absorbent consisting of calcium oxide, calcium hydroxide and/or calcium carbonate with sulfur oxides contained in the waste flue gas to form calcium sulfite, oxidizing the calcium sulfite into calcium sulfate and collecting the calcium sulfate, has been known. In operating this process, it is usual that the reactions represented by reaction Formulae 1 and 2 given below, in which the absorbent is contacted with the waste flue gas to form calcium sulfite, is carried out in an absorbing unit, and the reaction represented by reaction Formula 5 also given below, in which the calcium sulfite thus formed is oxidized into calcium sulfate, is carried out in an oxidizing unit provided separately from absorbing unit. Besides the main reactions (1) and (2), the reactions represented by reaction Formulae 3, 4 and 5 given below can also take place in the absorbing unit but the quantity of calcium sulfate formed is not large enough to enable the oxidizing unit to be eliminated.

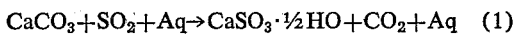
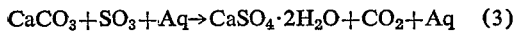
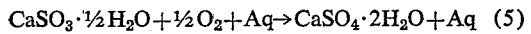

$$CaCO_3 + SO_2 + Aq \rightarrow CaSO_3 \cdot \tfrac{1}{2}HO + CO_2 + Aq \quad (1)$$

$$Ca(OH)_2 + SO_2 + Aq \rightarrow CaSO_3 \cdot 2H_2O + Aq \quad (2)$$

$$CaCO_3 + SO_3 + Aq \rightarrow CaSO_4 \cdot 2H_2O + CO_2 + Aq \quad (3)$$

$$Ca(OH)_2 + SO_3 + Aq \rightarrow CaSO_4 \cdot 2H_2O + Aq \quad (4)$$

$$CaSO_3 \cdot \tfrac{1}{2}H_2O + \tfrac{1}{2}O_2 + Aq \rightarrow CaSO_4 \cdot 2H_2O + Aq \quad (5)$$

In such a process as described above, it is very important to increase the percent absorption of sulfur dioxide and at the same time, to increase the conversion of the calcium hydroxide or calcium carbonate used into calcium sulfite or calcium sulfate. However, according to the prior art process it is extremely difficult to simultaneously satisfy both requirements. This is because one encounters the contradiction that the pH of the absorbing liquid need be maintained above 6 for satisfying the former requirement, whereas it must be lowered to below 4 for satisfying the latter requirement.

In order to deal with such contradiction, in the process of this invention means for generating fine air bubbles in the absorbing liquid is disposed in an absorbing liquid reservoir from which the absorbing liquid is supplied to the main body of the absorbing unit, so as to oxidize sulfur dioxide, sulfite ions and calcium sulfite, present in said absorbing liquid, into calcium sulfate through the reactions represented by reaction Formulae 5, 6 and 7, and the excess air leaving said reservoir is led into the main body of the absorbing unit to promote the formation of calcium sulfate also in said main body of the absorbing unit through said reactions (5), (6) and (7), whereby a high percent absorption of sulfur dioxide can be obtained even when the pH of the absorbing liquid is below 4.

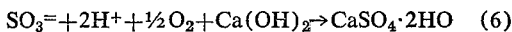
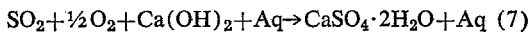

$$SO_3^= + 2H^+ + \tfrac{1}{2}O_2 + Ca(OH)_2 \rightarrow CaSO_4 \cdot 2HO \quad (6)$$

$$SO_2 + \tfrac{1}{2}O_2 + Ca(OH)_2 + Aq \rightarrow CaSO_4 \cdot 2H_2O + Aq \quad (7)$$

Sulfuric anhydride is readily absorbed under low pH conditions and, therefore, the absorption of sulfuric anhydride has no significance for the advantage of the process of this invention. Besides the above-described advantage, the process of this invention has the additional advantage that the desulfurizing procedure can be simplified, because according to the invention it is unnecessary to provide an oxidizing unit separately from the absorbing unit.

Now, a preferred embodiment of the present invention will be described with reference to the accompanying drawing.

The drawing is a schematic diagram showing an apparatus for practicing the process of this invention.

Referring to the drawing, a waste flue gas 1 containing sulfur oxides is first led into a cooling tower 2, in which the temperature of said waste flue gas is lowered to a level suitable for the absorption of $SO_2$ and at the same time, the dusts are removed from said flue gas, by a spray of water circulated by a pump 3. The circulating water is partially drained as indicated by the arrow 4 to prevent the accumulation of the dusts, and fresh water is replenished as indicated by the arrow 5 to make up the evaporation loss and the quantity of water discarded.

The humidified and cooled flue gas is introduced into a first absorbing tower 7 through a duct 6. An absorbing liquid which is supplied from a second absorbing tower 8 through a conduit 9 and in which the reactions have fairly advanced, is circulated through the first absorbing tower 7 by a pump 10. Therefore, the flue gas containing $SO_2$ at a high concentration is contacted by the absorbing liquid in the first absorbing tower 7 and a reaction takes place therebetween which is primarily intended to complete the reactions in the absorbing liquid, and the pH of the absorbing liquid is maintained below 4.

This reaction can be further advanced by providing fine air bubble generating means in an absorbing liquid reservoir 11. In the embodiment shown, a stirrer is disposed, as the air bubble generating means, in a tank constituting the absorbing liquid reservoir. Air introduced into the bottom of the tank from a compressor 12 is stirred by the stirrer to form fine air bubbles and the sulfite present in the absorbing liquid is oxidized into gypsum ($CaSO_4 \cdot 2H_2O$) through the reactions (5), (6) and (7). The equilibrium pressure of $SO_2$ in the absorbing liquid becomes smaller as the oxidation reaction advances, so that the absorption of $SO_2$ in the absorbing tower 7 is facilitated and the quantity of the unreacted quick lime decreases. Therefore, the pH of the absorbing liquid becomes low. The low pH value of the absorbing liquid is advantageous for the oxidation reaction to proceed. Both of these effects enable the reaction of the absorbing liquid to be completed and the sulfite in the flue gas is substantially entirely converted into gypsum. The air discharged from the top of the absorbing liquid reservoir is introduced into the absorbing tower 7 and promote the reactions (5), (6) and (7) taking place in said tower.

The absorbing liquid circulating through the first absorbing tower 7 is partially led into a settler 14 through a conduit 13, and thence to a centrifugal separator 15 by which the gypsum 16 is collected. The resulting filtrate 17 and the overflow 17' from the settler 14 are supplied to a tank 19 for the preparation of the material lime slurry.

The waste flue gas leaving the first absorbing tower 7 is led through a duct 18 into the second absorbing tower 8. The second absorbing tower 8 is circulatorily supplied by a pump 21 wiht a highly absorptive absorbing liquid of a relatively high pH, which is prepared from the lime slurry supplied from the lime slurry preparation tank 19 through a conduit 20, and a reaction takes place therein which is primarily intended to remove $SO_2$ from the flue gas and the pH of the absorbing liquid is maintained above 6. Similar to the absorbing liquid circulating line of the first absorbing tower, fine air bubble generating means is provided in an absorbing liquid reservoir 22 for the second absorbing tower 8 to enhance the $SO_2$ absorbing efficiency. Because of the high pH of the absorbing liquid circulating through the second absorbing tower 8, the oxidation of calcium sulfite into gypsum does not proceed so far as in the first absorbing tower 7 and the absorbing liquid becomes a slurry of a mixture of calcium sulfite and gypsum. The air discharged from the top of the absorbing liquid reservoir 22 is led into the second absorbing tower to promote the oxidation reaction in said tower, as in the case of the first absorbing tower.

The lime slurry supplied to the circulation line of the second absorbing tower 8 is prepared in the slurry preparation tank 19 from a material line 23, the filtrate 17 from the centrifugal separator 15, the overflow 17' from the settler 14 and water 24. The clean flue gas leaving the second absorbing tower 8 after the $SO_2$ has been removed therefrom in said second absorbing tower is led through a duct 25 and released into the atmosphere from a chimney 26.

Although in the embodiment shown the absorbing liquid reservoirs 11 and 22 are respectively provided separately from the first and second absorbing towers, it is to be understood that the bottom portions of said respective towers may be utilized as reservoirs instead of providing the separate reservoirs.

The fine air bubble generating means disposed in each absorbing liquid reservoir is not necessarily restricted to the type described herein but it may be a rotary atomizer, a shell-and-tube nozzle or other gas-liquid contacting mechanism.

The overflow 17' from the settler 14 is returned to the liquid circulation lines of the respective absorbing units for the purpose of increasing the purity of the collected gypsum, because even when the oxidation reaction is promoted in the manner described above, the presence of a small quantity of unreacted lime in the calcium sulfite is inevitable. The calcium sulfite and the unreacted lime can be separated from gypsum as overflow from settler since the particles sizes of their crystals are smaller than that of gypsum.

EXAMPLE

A comparison test was conducted to compare the effect of the process of this invention with that of the conventional process by applying each process to a waste flue gas from the combustion of heavy oil.

Test apparatus

Cooling tower: Spray tower, diameter, 250 mm.
First absorbing tower:
    Lattice packed tower:
        Diameter, 200 mm.
        Height, 2,500 mm.
        Material, hard glass
        Lattices, hard vinyl chloride lattices:
            Pitch, 15 mm.
            Height of lattice stack, 1,600 mm.
Liquid reservoir:
    Tank equipped with rotary atomizer:
        Diameter, 350 mm.
        Height, 500 mm.
        Capacity, 30 l.
        Rotary atomizer:
            Diameter of rotor, 80 mm.
            Speed, 3,000 r.p.m.
            Material, SUS 32
Second absorbing tower:
    Lattice packed tower:
        Diameter, 200 mm.
        Height, 2,500 mm.
        Material, transparent acrylic resin
        Lattices, same as in the first absorbing tower Test conditions Waste flue gas:
    Flow rate, 50 $Nm^3/hr$.
    Inlet gas temperature, 130° C.
    Outlet gas temperature, 50° C.
    Composition:
        $SO_2$, 0.1% by volume
        $O_2$, 3.8% by volume
        $H_2O$, 10.5% by volume
        $N_2$, remainder
Absorbent:
    $Ca(OH)_2$ slurry:
        Concentration, 5%
        Supply rate, 3 l./hr.
        Circulation rate of absorbing liquid:
            First absorbing tower, 400 l./hr.
            Second absorbing tower, 400 l./hr.
Oxidation of absorbing liquid:
    Flow rate of air introduced, 10$m^3$/hr.

Test results (1) When the absorbing liquid was oxidized by air blown into the absorbing liquid reservoir (the process of this invention).—A sample absorbing liquid taken out of the first absorbing tower had a pH of 2.5–4.0 and a temperature of 52–56° C., and contained 0.71 mol/l. of $CaSO_4 \cdot 2H_2O$ but no $CaSO_3 \cdot \frac{1}{2}H_2O$ nor $CaCO_3$, signifying that the limes had been substantially completely converted into gypsum. By the filtration of the absorbing liquid, gypsum crystals of a size of 20–100 microns could be obtained.

The pH of the absorbing liquid circulating through the second absorbing tower was 7.0–10.0 and the total percent absorption of $SO_2$ was 90–94%.

(2) When the absorbing liquid was not oxidized (the conventional process).—A sample absorbing liquid taken out of the first absorbing tower had a pH of 4.0–7.0 and a temperature of 54–58° C., and contained 0.10 mol/l. of $CaSO_4 \cdot 2H_2O$, 0.54 mol/l. of $CaSO_3 \cdot \frac{1}{2}H_2O$ and 0.07 mol/l. of $CaCO_3$. The oxidation ratio of $CaSO_3 \cdot \frac{1}{2}H_2O$ was 15% and the conversion of the material lime into sulfite and sulfate was 90%.

The pH of the absorbing liquid circulating through the second absorbing tower was 8.0–10.0 and the total percent absorption of $SO_2$ was 85–88% in average.

What is claimed is:

1. In a process for desulfurizing waste flue gases while producing gypsum as a by-product, by contacting a waste flue gas containing sulfur oxides with a liquid absorbent in a gas absorbing unit, said liquid absorbent selected from the group consisting of a slurry of calcium hydroxide, a slurry of calcium carbonate, or a slurry of calcium oxide, and then oxidizing the calcium sulfite produced from the reaction of sulfur oxides and the liquid absorbent into gypsum, the improvement wherein two gas absorbing units are provided and the waste flue gas is passed in series from a first gas absorbing unit to a second gas absorbing unit, while the absorbing liquid is supplied from the second gas absorbing unit to the first gas absorbing unit and whereby the pH of the absorbing liquid is maintained below 4 in the first absorbing unit and above 7 in the second absorbing liquid; providing absorbing liquid reservoirs below the gas absorbing units, accumulating the calcium sulfite, produced in the gas absorbing units by the reaction of the liquid absorbent and the sulfur oxides, into the liquid reservoirs, introducing fine bubbles of air into the absorbing liquid reservoirs to oxidize the calcium sulfite into gypsum, whereby the air introduced into the absorbing liquid reservoirs is subsequently discharged into the gas absorbing units to oxidize the absorbing liquid in the gas absorbing units.

2. A process for desulfurizing waste flue gases, according to claim 1, the improvement wherein the absorbing liquid leaving the gas absorbing unit is led into a settler and an overflow from said settler is returned to said gas absorbing unit, while an underflow from said settler is introduced into a filter means to collect gypsum crystals therefrom.

References Cited
UNITED STATES PATENTS

| | | | |
|---|---|---|---|
| 2,090,142 | 8/1937 | Nonhebel et al. | 23—122 X |
| 3,632,306 | 1/1972 | Villiecs-Fisher et al. | 23—25 Q |
| 2,113,198 | 4/1938 | Nonhebel et al. | 23—25 Q |
| 1,986,889 | 1/1935 | Fulton | 23—119 |
| 2,082,006 | 6/1937 | Johnstone | 23—122 X |
| 2,898,190 | 8/1959 | Grosskinsky et al. | 23—115 |

OSCAR R. VERTIZ, Primary Examiner

G. A. HELLER, Assistant Examiner

U.S. Cl. X.R.

423—242